US006897402B2

(12) United States Patent
Crawmer

(10) Patent No.: US 6,897,402 B2
(45) Date of Patent: May 24, 2005

(54) PLASMA-ARC SPRAY ANODE AND GUN BODY

(75) Inventor: Daryl E. Crawmer, Fall River, WI (US)

(73) Assignee: Thermal Spray Technologies, Inc., Sun Prairie, WI (US)

(*) Notice: Subject to any disclaimer, the term of this patent is extended or adjusted under 35 U.S.C. 154(b) by 208 days.

(21) Appl. No.: 10/146,005

(22) Filed: May 15, 2002

(65) Prior Publication Data

US 2003/0201257 A1 Oct. 30, 2003

Related U.S. Application Data

(60) Provisional application No. 60/375,268, filed on Apr. 24, 2002.

(51) Int. Cl.[7] .......... B23K 10/00

(52) U.S. Cl. .......... 219/121.47; 219/121.52; 219/121.48; 219/75

(58) Field of Search .......... 219/121.5, 121.51, 219/121.52, 121.48, 76.16, 76.15, 74, 75, 121.47, 73; 315/111.21, 111.31

(56) References Cited

U.S. PATENT DOCUMENTS

| | | | | | |
|---|---|---|---|---|---|
| 3,914,573 | A | * | 10/1975 | Muehlberger | 219/121.5 |
| 4,626,648 | A | * | 12/1986 | Browning | 219/121.52 |
| 5,132,511 | A | * | 7/1992 | Labrot et al. | 219/121.49 |
| 5,164,568 | A | * | 11/1992 | Sanders | 219/121.5 |
| 5,444,209 | A | * | 8/1995 | Crawmer et al. | 219/121.52 |

* cited by examiner

*Primary Examiner*—Mark Paschall
(74) *Attorney, Agent, or Firm*—Michael Best & Friedrich, LLP

(57) ABSTRACT

The invention recites a plasma-arc spray gun comprising a cathode and an anode defining a longitudinal axis. The anode further includes an external surface and an internal chamber, the internal chamber extending from a first end to a second end. At least a portion of the internal chamber is defined by revolving a non-linear curve about the longitudinal axis. The plasma-arc spray gun also includes a gun body supporting the cathode and the anode.

23 Claims, 3 Drawing Sheets

PLASMA-ARC SPRAY ANODE AND GUN BODY

RELATED APPLICATION DATA

This application claims the benefit of the priority date under 35 U.S.C. Section 119(e) of U.S. Provisional Application No. 60/375,268 filed Apr. 24, 2002, which is hereby fully incorporated by reference.

BACKGROUND AND SUMMARY OF THE INVENTION

The present invention relates to thermal spraying, and particularly to improved guns for spraying metallic and ceramic particles onto a substrate. More particularly, the present invention relates to water-cooled thermal spray guns having an anode.

Plasma-arc spray guns use a power supply and a cathode disposed within an anode to generate a plasma for use in depositing a material onto a substrate. A gas supplied to the chamber between the anode and the cathode converts to high-temperature plasma as it passes through an arc that extends between the anode and cathode. To provide for stable and controllable plasma, it is important to control the location of the arc between the anode and cathode. To that end, other anodes contain a series of cylindrical and frustoconical sections designed to position the arc at the desired point. However, these contours produce undesirable turbulence behind the arc attachment point and reduce the performance of the gun.

The large currents of electricity flowing between the anode and the cathode cause the anode to heat significantly, thereby reducing its performance and operating life. To control the heating and reduce anode damage, a cooling-water flow passes around and within the anode. Present plasma-arc spray guns employ water channels that have multiple chambers and flow paths with differing flow areas. Rapid increases in flow area cause sudden pressure drops that can be detrimental to the cooling efficiency of the water flow. More specifically, the pressure drop allows the water to boil and greatly reduces its cooling effectiveness.

Another factor in the determination of anode life is the wall thickness of the anode. Large changes in wall thickness in adjacent sections can result in significant thermal stress and component failure. In addition, varying wall thickness can result in significantly different heat transfer characteristics causing hot spots or cold spots on the surface of the anode.

Thus, the plasma-arc spray gun of the present invention provides a cathode and an anode defining a longitudinal axis. The anode further includes an external surface and an internal chamber, the internal chamber extending from a first end to a second end. At least a portion of the internal chamber is defined by revolving a non-linear curve about the longitudinal axis. The plasma-arc spray gun also includes a gun body supporting the cathode and the anode.

In another construction of the plasma-arc spray gun the gun is powered by an external power source having a first lead and a second lead. The gun provides a gun body and an anode supported by the gun body and electrically connected to the first lead of the power source. The anode also has a longitudinal axis and includes an external surface and an internal chamber. The internal chamber has a first open end receiving a flow of gas and a second open end discharging a flow of plasma. The internal chamber also includes a portion defined by revolving a non-linear curve about the longitudinal axis. The plasma-arc spray gun further includes a cathode supported by the gun body and electrically connected to the second lead of the power source and a gas injector providing the flow of gas through the first open end of the anode. The power source initiates an arc between the anode and the cathode, and a portion of the flow of gas passes through the arc to generate the flow of plasma.

In preferred embodiments, the non-linear curve is defined by a polynomial equation. In addition, the non-linear curve is disposed between the first open end of the anode adjacent the gas injector and the arc attachment area.

The invention further provides a method of manufacturing a plasma-arc spray gun. The method comprises the steps of forming an inner chamber within an anode having a longitudinal axis. The inner chamber includes a first open end, a second open end, and at least one region disposed therebetween and defined by the revolution of a non-linear curve about the longitudinal axis. The method further includes the steps of positioning the anode and the gas injector within the gun body and positioning the cathode at least partially within the inner chamber of the anode.

In other embodiments, the method further comprises the step of forming an external anode surface defined by the revolution of a second non-linear curve about the longitudinal axis. The second non-linear curve is substantially parallel to and spaced apart from the first non-linear curve.

BRIEF DESCRIPTION OF THE DRAWINGS

The detailed description particularly refers to the accompanying figures in which.

DETAILED DESCRIPTION OF THE INVENTION

Figure 1:
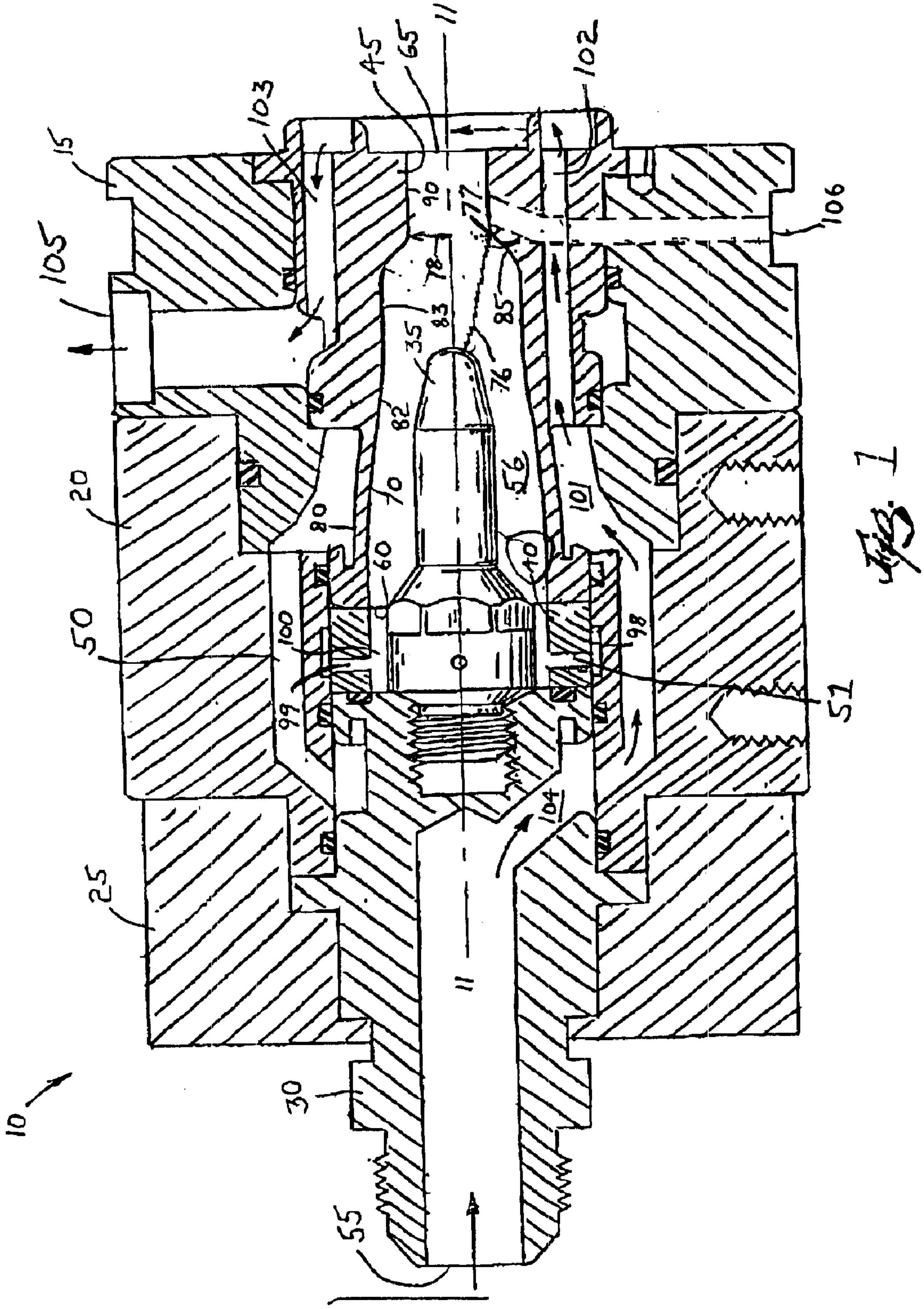
FIG. 1 is a longitudinal cross-sectional view of a plasma-arc spray gun including a contoured anode in accordance with the present invention.

FIG. 1 is a longitudinal sectional view of a plasma gun 10 capable of producing a plasma for the application of metallic or ceramic particles on a substrate. A similar plasma gun is described in U.S. Pat. No. 5,444,209 issued to Crawmer, which is hereby fully incorporated by reference. The gun 10 of FIG. 1 includes a front housing 15, a middle housing 20, a rear housing 25, a cathode holder 30 supporting the cathode 35, a gas injector 40, and an anode 45. The front, middle, and rear housings 15, 20, 25 are generally tubular and define a common longitudinal axis 11—11. The housings 15, 20, 25 may be connected by bolts, screws or any attachment mechanism capable of firmly holding and aligning the components. In addition, the housings 15, 20, 25 support the cathode holder 30, anode 45, and gas injector 40 forcing their proper alignment relative to one another. The housings 15, 20, 25 also provide coolant passages 50 (described below), arc gas passages 51, and electrical circuits.

The cathode holder 30 supports the cathode 35 in the proper position within the anode 45 and provides a convenient point to connect an electrical power supply and a water inlet 55 to the gun 10. In some constructions, the cathode holder 30 includes a threaded hole sized to receive a threaded portion extending from the cathode 35. In other constructions, the cathode holder 30 includes a projection that threads into the cathode 35. The actual method used to attach the cathode 35 to the cathode holder 30 is not important to the function of the present invention. The anode 45 and cathode 35 cooperate with one another to define an annular flow chamber 56 for the flow of gas therebetween. The desired position of the cathode 35 within the anode 45 is determined based on the shape of the cathode 35 and the anode 45 as well as their sizes relative to one another. Accordingly, a wide variety of positions are possible depending upon the particular arrangements and sizes of the anode 45 and cathode 35. FIG. 1 illustrates one possible configuration of a cathode 35 disposed in the desired position within the anode 45.

The anode 45 is an elongated substantially tubular member having a large opening 60 near its rear and a smaller opening 65 near its front. Between the large opening 60 and the small opening 65 is a contoured section 70. The structure of the anode 45 is discussed in more detail below with respect to FIGS. 2 and 3. In operation, an arc 76 between the anode 45 and cathode 35 attaches to the anode 45 at an arc attachment area 77. In one preferred embodiment, the inner radius 78 of the anode 45 at the arc attachment area 77 is approximately 0.0938 inches (2.38 mm), however larger and smaller openings will also function. For example, inner radii 78 that are 0.005 inches larger or smaller than the radius described above will allow the gun 10 to function properly. In many instances, still larger or smaller radii may be employed in the anode 45.

Figure 2:
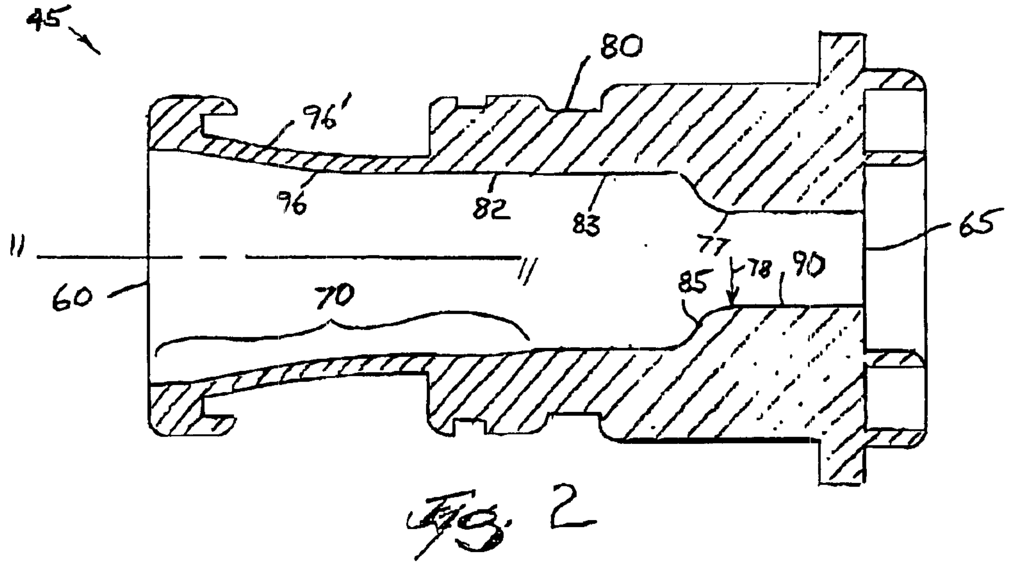
FIG. 2 is a longitudinal cross-sectional view of the anode of FIG. 1.
Figure 3:
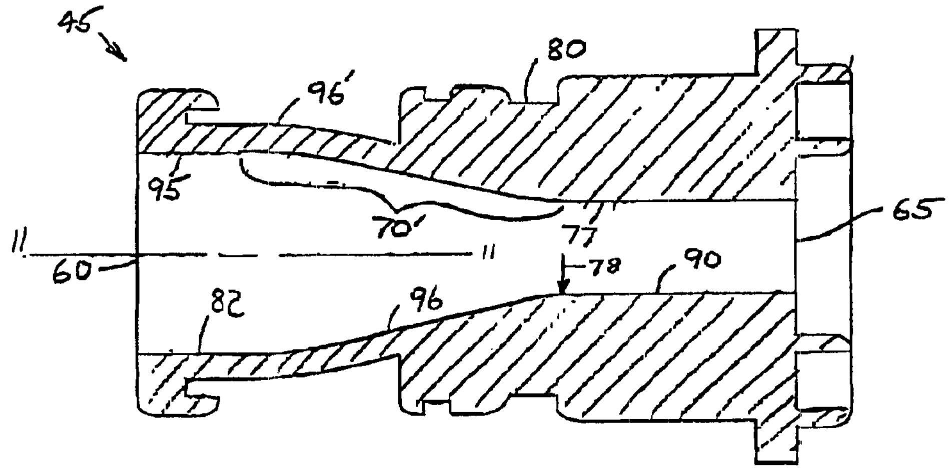
FIG. 3 is a longitudinal cross-sectional view of another embodiment of an anode in accordance with the present invention.

FIG. 2 shows a cross section of an anode 45 in accordance with the present invention. The anode 45 has an outer surface 80 and an inner surface 82. The shape of the outer surface 80 of the anode 45 allows it to engage the front housing 15 to prevent movement of the anode 45 relative to the cathode 35. At least a portion of the inner surface 82 of the anode 45 is defined by a non-linear curve. More particularly, at least a portion of the inner surface 82 of the anode 45 is defined by a curve characterized by a second order or higher polynomial equation. In FIGS. 1–3, this portion that is defined by a polynomial equation has been identified as contoured section 70 or 70'. To form the contoured section or internal portion of the anode defined by a polynomial equation or non-linear curve, the non-linear curve is rotated about the longitudinal axis 11—11 of the anode 45. For example, in FIGS. 1–3, the non-linear curve is rotated around axis 11—11.

In one embodiment, the inner surface 82 of the anode 45 may be divided into multiple sections. FIG. 1 shows an anode having four sections: the contoured section 70, a straight section 83, a transitional section 85, and an exit section 90. The exit section 90 is sized to provide the desired exit velocity and flow out of the gun 10. Similarly, the transitional section 85 provides a smooth transition between the exit section 90 and the straight section 83. In other constructions (not shown), the straight section 83 is combined with the contoured section 70, thus eliminating the straight section 83. In other embodiments, the entire inner surface 82 of the anode 45 may be defined by a non-linear curve.

The use of a continuous curve to define the contoured section 70 improves the functionality of the gun 10. More particularly, the improved streamlined configuration of the anode inner surface 82 improves the flow characteristics of the gas within the annular flow chamber 56, thereby improving the cooling of the cathode 35. In addition, the non-linear contour of the anode 45 minimizes turbulence behind the point of arc attachment, namely, between the gas injector and the arc attachment area 77. The use of a high order polynomial to define the contoured section 70 improves the gas flow characteristics by eliminating sudden section transitions, reduces the break in period of the anode 45, and promotes longer anode life by providing better resistance to erosion induced by multiple starts and stops. Sudden section transitions induce turbulence and pressure loss in the flow of gas.

The contoured section 70 follows a curve characterized by a high-order polynomial function of the form $y=A_0+A_1x+A_2x^2+A_3x^3+A_4x^4+A_5x^5+ \ldots A_nx^n$. More particularly, the high-order polynomial may be a second-order polynomial or higher. The following table characterizes two embodiments of the contoured section 70:

| | $A_0$ | $A_1$ | $A_2$ | $A_3$ | $A_4$ | $A_5$ |
|---|---|---|---|---|---|---|
| 1 | 0.365835 | 0.446148 | −2.13431 | 3.009243 | −1.72739 | 0.343881 |
| 2 | −0.015814973 | 0.30758798 | −1.259815399 | 1.764776317 | −0.903923652 | 0.155297451 |

Any number of polynomials can accurately describe the desired curve or a similar curve within the required tolerances of the anode 45. In addition, one or many of the coefficients ($A_0, A_1, \ldots A_n$) could be zero so long as one of the higher order coefficients ($A_2 \ldots A_n$) is not zero. In other embodiments, the coefficients $A_0 \ldots A_n$ are between −10 and 10, while in still other embodiments x-values between 0 and 3 yield y-values between −1 and 10. It should be understood that many contours defined by many high order curves are available that will function with the present invention, and therefore, the invention should not be limited to the two curves described above. FIG. 3 illustrates another construction of the anode 45 having a contoured section 70' different from that illustrated in FIGS. 1 and 2.

Figure 4:
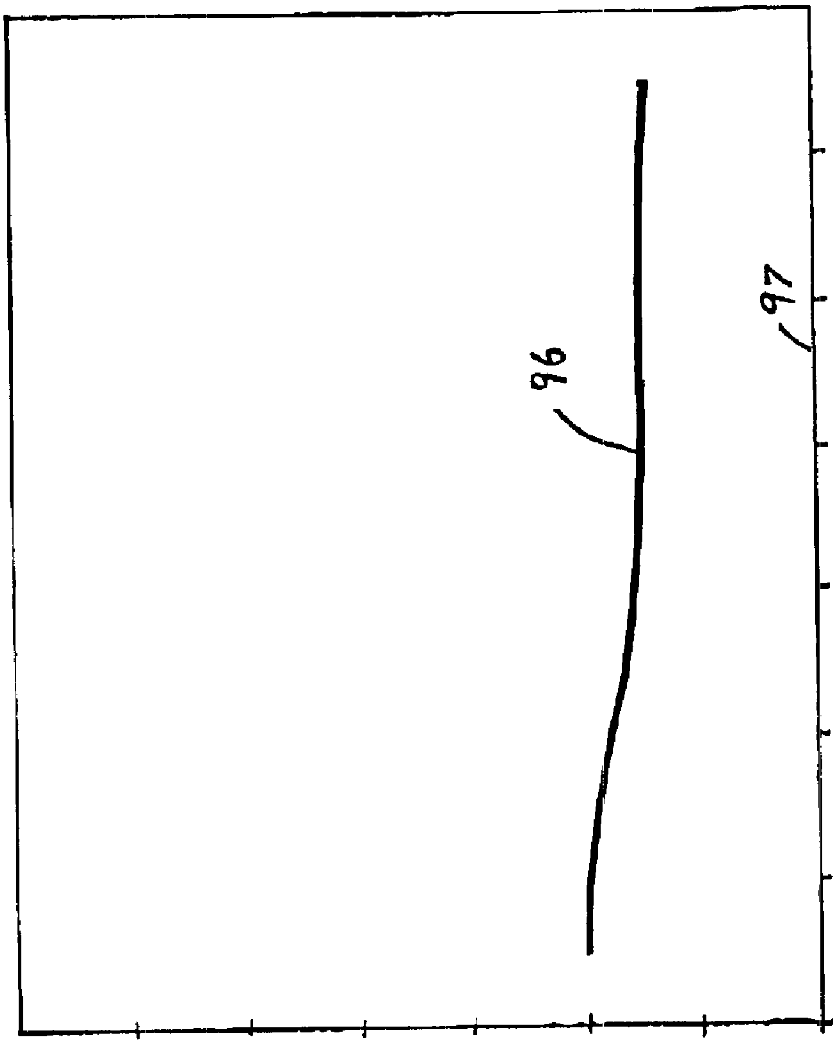
FIG. 4 is an x-y plot illustrating one possible polynomial curve that defines a section of the anode.

FIG. 4 illustrates a curve 96 generated by a high-order polynomial. To arrive at the contour section 70 of the anode 45, the curve 96 shown in FIG. 4 is revolved around the x-axis 97 which corresponds to the longitudinal axis 11—11 in FIG. 1. Again, any shaped contoured section desired can be defined by a non-linear curve characterized by a polynomial equation. Thus, the y-value represents the radius of the inner chamber of the anode 45 in the contour section 70, while the x-value represents the axial position along the anode 45. In other constructions, the curve 96 is revolved around an axis other than the x-axis 97 to arrive at the desired internal contour.

To further improve the performance of the gun 10, the wall thickness of at least a portion of the anode 45 is substantially uniform as shown in FIG. 1. This improves the overall performance of the gun 10, particularly at high power levels and high total arc gas flows, which increase pressure in the anode 45, thereby increasing the heat load in the rear section of the anode 45. To maintain the consistent wall thickness, the outer wall of the anode 45 in the anode throat area 75 follows a substantially similar curve 96' as the contoured section 70. By using similar parallel curves 96, 96' for the inner wall and outer wall respectively, the parallel relationship of the walls is maintained, eliminating sudden wall thickness changes and corresponding hot and cold spots. Hot and cold spots reduce the effectiveness of the gun in several ways. By providing unequal heat transfer, hot and cold spots may produce plasma of differing temperatures exiting the gun. The unequal plasma temperatures may result in a variation of the quality of the material being deposited on the substrate, which is undesirable. In addition, hot and cold spots can produce unequal thermal expansion of the anode 45 resulting in misalignment between the anode 45 and the cathode 35. The misalignment may result in varying arc lengths and an inconsistent plasma. Again, this is undesirable. Further, hot and cold spots can result in significant thermal stress within the anode 45. The stress may result in rapid arc erosion and/or permanent distortion of the anode 45, thereby shortening its useful life.

The gas injector 40 is sandwiched between the anode 45 and the cathode holder 30. The outer diameter of the gas injector 40 and a portion of the inner surface of the middle housing 20 cooperate to form an annular passage 98. Another passage (not shown) in the middle housing 20 leads between the annular passage 98 and a mating passage (not shown) in the rear housing 25 to supply a source of inert primary gas, such as, but not limited to, argon or helium. A series of bores 99 extend through the gas injector 40 in a generally radial direction to direct the gas to the inner diameter of the gas injector 40 where it is redirected by an annular gap 100 into the annular flow chamber 56 defined by the anode 45 and the cathode 35.

Referring again to FIG. 1, the cooling water flow paths 50 allow cooling water to enter through the cathode holder 30 and flow to an annular chamber 101 defined between the anode 45 and the housings 15, 20, 25. The cooling water then enters one of a plurality of cooling bores 102 within the anode 45. The cooling bores 102 improve the cooling efficiency in the hotter region of the anode 45 adjacent the arc attachment area 77 and the areas of the anode 45 exposed to the plasma flow. The cooling water then circulates around a cover piece (not shown), through outlet bores 103 in the anode 45, and out the cooling water outlet 105 illustrated at the top of FIG. 1. To further improve heat transfer, the flow areas of the different flow paths are carefully sized to prevent sudden increases or decreases in pressure. A sudden increase in flow area can reduce the pressure to a point that allows the water within the chamber to boil and change to steam. If boiling begins, heat transfer is hampered reducing the performance and the capabilities of the gun 10. Boiling water and steam do not perform well as coolants and are thus undesirable. If, on the other hand, the water has boiled or begun to boil, and the flow area is drastically reduced, the steam could condense, also hampering heat transfer. As shown in FIG. 1, the water flow paths 50 provide for gradual area transitions and generally consistent diameters throughout the gun 10 to minimize pressure loss and enhance the cooling effect of the water.

The area most susceptible to pressure drops and boiling is the annular chamber 101 defined by the inner surface of the front housing 15 and the outer surface 80 of the anode 45. The annular chamber 101 acts as a manifold, receiving the coolant flow from the cathode holder coolant bores 104 and distributing it through the cooling bores 102 of the anode 45. The annular chamber 101 has a large volume compared to the cooling bores 102 and the cathode holder coolant bores 104. To reduce the likelihood of boiling, the flow area and the volume of the annular chamber 101 are minimized. In preferred constructions, the largest flow area is less than about 0.5 $in^2$. Guns having larger flow areas are susceptible to coolant boiling.

In other constructions (not shown), the flow direction described above may be reversed. The flow enters at the previous water outlet 105 and exits through the cathode holder 30. Cooling water enters the front housing 15 through the cooling water outlet 105 and flows through the outlet bores 103 in the anode 45 to the cover (not shown). The cover connects to the cooling bores 102 in the anode 45 to direct coolant near the inner bore of the anode 45. The coolant then flows into the annular chamber 101, out the cathode holder coolant bores 104, and out the water inlet 55.

In operation, the gun functions as follows: Cooling water is introduced into the plasma-arc spray gun 10 through a fitting (not shown) attached to the cathode holder 30. The water flows through the various internal passages in the spray gun 10 and out front housing 15. The cathode 35 is connected to the negative lead of a power supply (not shown) while the anode 45 is electrically connected to the positive lead. An electrical arc 76 is established between the anode 45 and the cathode 35. Primary gas is supplied to the plasma-arc spray gun 10 through passages (not shown) to the annular space 98. The gas, which is injected into the gun 10 at the rear of the anode 45 by the gas injector 40, flows into the anode 45 and through the arc attachment area 77 where it is heated by the arc 76. The gas changes to a plasma state and flows out the small opening 65 of the anode 45. In many constructions, the annular gap 100 is configured to induce a swirl in the gas flow. The swirl forces the arc 76 to rotate around the anode 45, thereby increasing the life of the anode 45. The coating powder, introduced into the interior of the anode 45 through the holes 106, is entrained in the plasma stream and is accelerated out the plasma-arc spray gun 10 with the plasma stream. The plasma gun 10 is therefore capable of producing a plasma for the application of metallic or ceramic particles on a substrate. The holes 106 are shown in one possible position within the anode. Other constructions inject the coating powder upstream of the arc 76, while still others inject the coating downstream of the arc 76 as shown in FIG. 1. For purposes of the present invention, the actual point at which the powder is introduced into the flow stream is not important.

It should be noted that throughout the description of the drawings, water was described as the cooling fluid. This should not be read to limit the invention to plasma-arc spray guns 10 that employ water as a coolant. The present invention will function using coolants other than water and therefore should be interpreted as such.

Although the invention has been described in detail with reference to certain preferred embodiments, variations and modifications exist within the scope and spirit of the invention as described and defined in the following claims.

What is claimed is:

1. A plasma-arc spray gun comprising:

a first electrode;

a second electrode having a longitudinal axis, the second electrode including an external surface and an internal chamber, the internal chamber extending from a first end to a second end, at least a portion of the internal chamber being defined as a non-linear curve revolved about the longitudinal axis, the non-linear curve defined by a polynovinal equation, at least a portion of the first electrode being disposed within the internal chamber; and a gun body supporting the first electrode and the second electrode.

2. The plasma-arc spray gun of claim 1, wherein the polynomial equation is characterized by a second order or higher order polynomial equation of the form $y=A_0+A_1x+A_2x^2 \ldots A_nx^n$, wherein $A_0$ through $A_n$ are variables, y is the perpendicular distance from the longitudinal axis to the curve, and x is the axial position along the longitudinal axis, at least one of $A_2$ through $A_n$ being non-zero and y being between −1 and 10 when x is between 0 and 3.

3. The plasma-arc spray gun of claim 1, wherein the gun body further comprises a front housing, a middle housing, and a rear housing, and wherein the front, middle, and rear housings define a flow passage, through which coolant may flow.

4. The plasma-arc spray gun of ciaim 3, wherein coolant flows through the flow passage, and the coolant has a temperature and a pressure, the temperature increasing as the coolant flows along the flow passage, the flow passage sized and shaped to maintain the pressure above a boiling pressure of the coolant at all locations within the flow passage.

5. The plasma-arc spray gun of claim 1, further comprising a gas injector disposed adjacent the first end of the second electrode for the introduction of gas thereto, and wherein the internal chamber of the second electrode further includes an arc attachment area, the non-linear curve disposed between the arc attachment area and the first end of the second electrode.

6. The plasma-arc spray gun of claim 1, wherein the first electrode is a cathode and the second electrode is an anode.

7. The plasma-arc spray gun of claim 1, wherein the portion of the internal chamber defined as the non-linear curve extends from at least one of the first end and the second end.

8. A plasma-arc spray gun comprising:

a first electrode;

a second electrode having a longitudinal axis, the second electrode including an external surface and an internal chamber, the internal chamber extending from a first end to a second end, at least a portion of the internal chamber being defined as a non-linear curve revolved about the longitudinal axis, at least a portion of the first electrode being disposed within the internal chamber; and a gun body supporting the first electrode and the second electrode;

wherein the non-linear curve is a first non-linear curve and the external surface of the second electrode is at least partially defined by a second non-linear curve substantially parallel to the first non-linear curve, the first and second non-linear curves defining a wall of the second electrode having a constant wall thickness.

9. A plasma-arc spray gun powered by an external power source having a first lead and a second lead, the gun comprising:

a gun body;

a first electrode supported by the gun body and electrically connected to the first lead of the power source, the first electrode having a longitudinal axis and including an external surface and an internal chamber, the internal chamber having a first open end receiving a flow of gas and a second open end discharging a flow of plasma, the internal chamber including a portion that extends from one of the first open end and the second open end and that is defined as a non-linear curve revolved about the longitudinal axis, the first electrode having an arc attachment area within the portion defined by the revolution of the non-linear curve;

a second electrode supported by the gun body and electrically connected to the second lead of the power source; and a gas injector providing the flow of gas through the first open end of the first electrode;

wherein the power source initiates an arc between the first electrode and the second electrode, and wherein a portion of the flow of gas passes through the arc to generate the flow of plasma.

10. The plasma-arc spray gun of claim 9, wherein the non-linear curve is defined by a polynomial equation.

11. The plasma-arc spray gun of claim 10, wherein the polynomial equation is characterized by a second order or higher order polynomial equation of the form $y=A_0+A_1x+A_2x^2 \ldots A_nx^n$, wherein $A_0$ through $A_n$ are variables, y is the perpendicular distance from the longitudinal axis to the curve, and x is the axial position along the longitudinal axis, at least one of $A_2$ through $A_n$ being non-zero and A0 through $A_n$ being between −10 and 10.

12. The plasma-arc spray gun of claim 10, wherein the polynomial equation is characterized by a second order or higher order polynomial equation of the form $y=A_0+A_1x+A_2x^2 \ldots A_nx^n$, wherein $A_0$ through $A_n$ are variables, y is the perpendicular distance from the longitudinal axis to the curve, and x is the axial position along the longitudinal axis, at least one of $A_2$ through $A_n$ being non-zero and y being between −1 and 10 when x is between 0 and 3.

13. The plasma-arc spray gun of claim 9, wherein the gun body further comprises a front housing, a middle housing, and a rear housing, and wherein the front, middle, and rear housings define the internal flow passage, through which coolant may flow.

14. The plasma-arc spray gun of claim 13, wherein coolant flows through the flow passage and the coolant has a temperature and a pressure, the temperature increasing as the coolant flows along the flow passage and the pressure decreasing as the coolant flows along the flow passage, the flow passage sized and shaped to maintain the pressure above a boiling pressure of the coolant at all locations within the flow passage.

15. The plasma-arc spray gun of claim 9, wherein the first electrode and the gun body define an annular chamber therebetween, the maximum flow area of the annular chamber being less than about 0.5 square inches.

16. The plasma-arc spray gun of claim 9, wherein the gas injector is disposed adjacent the first end of the first electrode for the introduction of gas thereto, and wherein the arc attachment area is disposed adjacent an end of the portion defined by the non-linear curve.

17. The plasma-arc spray gun of claim 9, wherein the first electrode is an anode and the second electrode is a cathode.

18. A plasma-arc spray gun powered by an external power source having a first lead and a second lead, the gun comprising:

a gun body;

a first electrode supported by the gun body and electrically connected to the first lead of the power source, the first electrode having a longitudinal axis and including an external surface and an internal chamber, the internal chamber having a first open end receiving a flow of gas and a second open end discharging a flow of plasma, the internal chamber including a portion defined as a non-linear curve revolved about the longitudinal axis, the first electrode having an arc attachment area within the portion defined by the revolution of the non-linear curve;

a second electrode supported by the gun body and electrically connected to the second lead of the power source; and a gas injector providing the flow of gas through the first open end of the first electrode;

wherein the power source initiates an arc between the first electrode and the second electrode, and wherein a portion of the flow of gas passes through the arc to generate the flow of plasma, and wherein the gun body further includes an internal coolant flow passage, the passage having flow areas sized to maintain a pressure within a flow of coolant above a boiling pressure.

19. A method of manufacturing a plasma-arc gun, the method comprising:

forming an inner chamber within a first electrode having a longitudinal axis, the inner chamber including a first open end, a second open end, and at least one region disposed therebetween and defined by the revolution of a non-linear curve about the longitudinal axis, the non-linear curve defined by a polynomial equation;

positioning the first electrode and a gas injector within a gun body; and positioning a second electrode at least partially within the inner chamber.

20. The method of claim 19, further comprising the act of forming an external first electrode surface, wherein the non-linear curve is a first non-linear curve and at least a portion of the external first electrode surface is defined by the revolution of a second non-linear curve about the longitudinal axis, the second non-linear curve being substantially parallel to and spaced apart from the first non-linear curve.

21. The plasma-arc spray gun of claim 19, wherein the first electrode is an anode and the second electrode is a cathode.

22. A plasma-arc spray gun comprising:

a first electrode;

a second electrode having a longitudinal axis, the second electrode including an external surface and an internal chamber, the internal chamber extending from a first end to a second end, at least a portion of the internal chamber being defined as a non-linear curve revolved about the longitudinal axis, at least a portion of the first electrode being disposed within the internal chamber; and a gun body supporting the first electrode and the second electrode;

wherein the polynomial equation is characterized by a second order or higher order polynomial equation of the form $y=A_0+A_1x+A_2x^2 \ldots A_nx^n$, wherein $A_0$ through $A_n$ are variables, y is the perpendicular distance from the longitudinal axis to the curve, and x is the axial position along the longitudinal axis, at least one of $A_2$ through $A_n$ being non-zero and $A_0$ through $A_n$ being between −10 and 10.

23. A plasma-arc spray gun comprising:

a first electrode;

a second electrode having a longitudinal axis, the second electrode including an external surface and an internal chamber, the internal chamber extending from a first end to a second end, at least a portion of the internal chamber being defined as a non-linear curve revolved about the longitudinal axis, at least a portion of the first electrode being disposed within the internal chamber; and a gun body supporting the first electrode and the second electrode;

wherein the second electrode and the gun body define an annular chamber therebetween, the maximum flow area of the annular chamber being less than about 0.5 square inches.

* * * * *